United States Patent [19]

Sasaki

[11] 4,361,064
[45] Nov. 30, 1982

[54] PIPE SHEARING DEVICE

[76] Inventor: Yoshikazu Sasaki, 9-1 Sakuradai 4-Chome, Nerima-ku, Tokyo, Japan, 176

[21] Appl. No.: 192,835

[22] Filed: Oct. 1, 1980

[30] Foreign Application Priority Data

Oct. 11, 1979 [JP] Japan .................. 54/131219

[51] Int. Cl.³ .................. B26D 1/28; B26D 1/56; B26D 3/22
[52] U.S. Cl. .................. 83/319; 83/54; 83/338
[58] Field of Search .................. 83/319, 321, 338, 49, 83/54

[56] References Cited

U.S. PATENT DOCUMENTS

| 2,741,309 | 4/1956 | Czarnik | 83/319 X |
| 3,129,624 | 4/1964 | Auer | 83/319 X |
| 3,380,331 | 4/1968 | Boothe, Jr. et al. | 83/338 |
| 4,108,029 | 8/1978 | Borzym | 83/319 X |

Primary Examiner—Frank T. Yost
Attorney, Agent, or Firm—Wenderoth, Lind & Ponack

[57] ABSTRACT

A pipe shearing device provided with a holder means which is shifted laterally by means of a follower connected therewith and engaging in a cam groove of a drum cam, a pair of rotating blades slidably mounted on spline shafts, the first blade of the pair being arranged to cut the surface of the pipe to form a slit during its rotary movement to make it easy for the second blade of the pair to produce a cut pipe of the desired length by cutting through the slit during its opposite rotary movement, a clamp device which grips or holds the pipe unmovably while the pair of rotary blades are in motion, and a motor connected to the drum cam and the spline shafts through a gear train.

6 Claims, 10 Drawing Figures

PIPE SHEARING DEVICE

BACKGROUND AND SUMMARY OF THE INVENTION

This invention relates to a pipe shearing device, more particularly to a device which accurately shears a pipe into predetermined lengths automatically while the pipe is in constant motion as it is being fed into the device.

There are several types of pipe shearing devices presently known. One of them is provided with a holder means to which a lower blade is fixed while an upper blade is arranged so that it moves up and down by means of a crank mechanism. The holder means itself also is arranged to shift back and forth, parallel to the pipe and its metal pipe carrier, by means of a rack and pinion mechanism.

As both the holder means and the metal pipe carrier which carries a pipe are shifted forwardly at the same speed, the upper blade is so devised as to shift down whereby the pipe carried by the pipe carrier is cut into predetermined pieces in succession in conjunction with the lower blade.

A device of this kind usually requires two power sources, one of which is for the operation of the upper blade and the other for the operation of the rack and pinion mechanism. Such a device not only has power requirements in proportion to the number and capacity of the power sources required, but also the sheared edges of pipes cut by such a device are usually so warped by the shearing force of the upper blade as to form a dimple around the upper portion thereof seen when facing the cut edge of the pipe.

Another conventional device is similarly equipped with a holder means having a square slit along which a sliding member, provided with the upper blade, is arranged to move up and down while the lower blade is positioned at the bottom of the square slit. The up and down movement of the upper blade and the lateral back and forth motion of the holder means is actuated by a motor operated crank mechanism and regulated by a motor controller. However, for accurate and smooth operation, the device may require an additional control mechanism besides the main controller.

Pipe edges cut by this type of device are also so warped by the shearing force as to form a dimple around the upper portion thereof seen when facing the cut edge.

The object of this invention is to provide a solution to the problems of conventional pipe shearing devices.

A further object of this invention is to provide a pipe shearing device which has a pair of counter rotating blades, one of which first cuts a portion of the upper surface of the pipe to form a slit to make it easy for the second blade to cut through the slit to cut the pipe into desired lengths, thus eliminating deformation of the cut edges of the pipe.

Another object of this invention is to provide a compact pipe shearing device to cut pipes held in a moving pipe carrier into precisely predetermined lengths at high speed with a small power source.

A still further object of this invention is to provide a pipe shearing device which is easy to operate by means of a conventional control mechanism.

To this end the present invention provides a structure comprising a holder means connected to a cam follower engaging in a cam groove positioned in a drum cam which is driven by a motor through a gear means whereby the drum cam is rotated to shift laterally back and forth together with the holder means, a pair of rotary blades mounted respectively on a spline shaft supported by a box and arranged to rotate oppositely to each other, and one of the blades being rotated 360° to cut the surface of the pipe carried by the pipe carrier to form a slit, followed by the other blade which rotates 360° in the opposite direction to cut the whole pipe through the slit formed by the preceeding operation to a predetermined length, the pipe cut in this manner being free from deformations of the cut edges produced in conventional pipe cutting devices, a power transmission means which causes the rotary motion of the pair of blades, each blade being rotated oppositely to the other, and a clamp means provided in the holder means to grip the pipe firmly while the pair of counter rotating blades perform the cutting operation through a given clearance between a pair of wall blocks.

The above and other novel features of the invention will more fully appear from following description when the same is read in connection with the accompanying drawings. It is to be expressly understood, however, that the drawings are for the purpose of illustration only and not intended as a definition of the limits of the invention.

DETAILED DESCRIPTION OF THE INVENTION

A detailed description of the preferred embodiment of this invention will be given hereinafter, with specific reference to the drawings.

Figure 1:
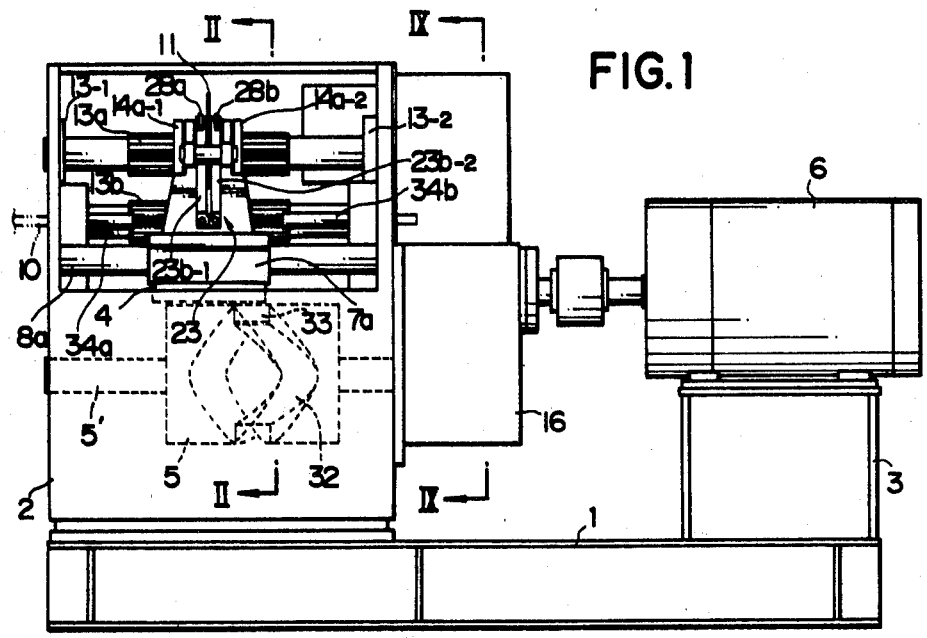
FIG. 1 is an elevation view of a preferred embodiment of this invention.
Figure 2:
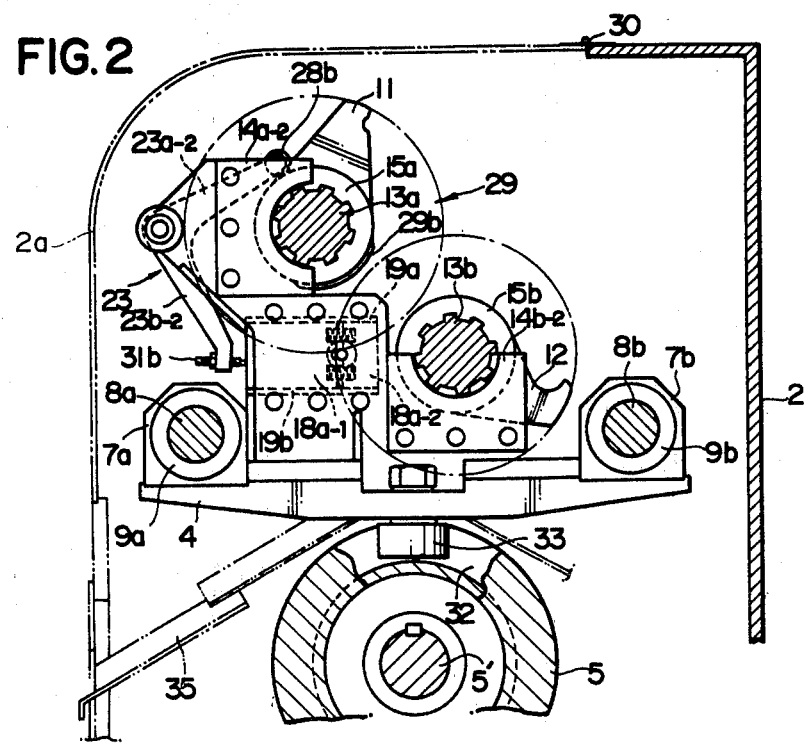
FIG. 2 is a sectional side view of the device of FIG. 1, taken along line II—II.
Figure 3:
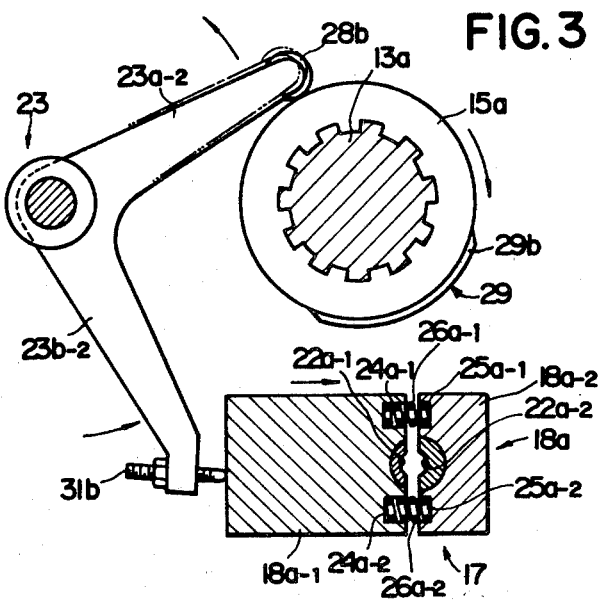
FIG. 3 is an enlarged sectional front view of a clamp means.

Referring to FIG. 1 and FIG. 2, there is shown a stand 1 on which a case 2 and a motor stand 3 are fixedly disposed. A holder means 4 and a drum cam 5 are positioned inside the case 2 and motor 6 is mounted on the stand 3. The case 2 is provided with a transparent hinged cover 2a hinged at 30. The holder means 4 arranged inside the case 2 is slidably supported on two shafts 8a and 8b extending through bosses 9a and 9b positioned in brackets 7a and 7b mounted on the holder means 4.

Figure 4:
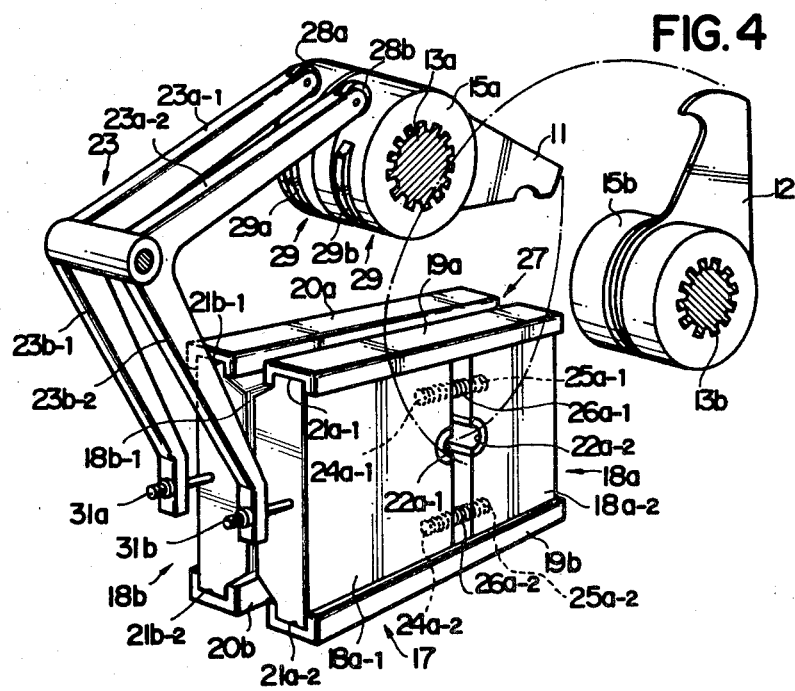
FIG. 4 is an enlarged perspective view of a clamp means.
Figure 5:
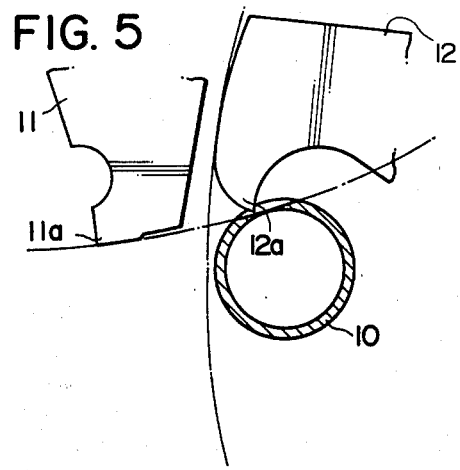
FIG. 5 is a schematic view illustrating the operation of a pair of rotary blades according to this invention.

FIG. 4 shows a clamp means and a pair of rotary blades consisting of the first blade 11 and the second blade 12, which will be described in detail hereinafter.

Figure 6:
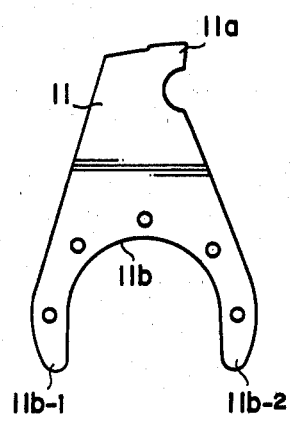
FIG. 6 is an enlarged front view of the first rotary blade.
Figure 7:
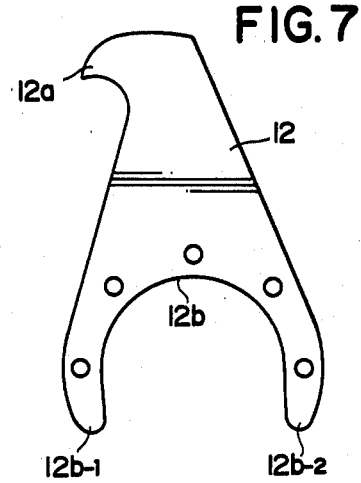
FIG. 7 is an enlarged front view of the second rotary blade.
Figure 8:
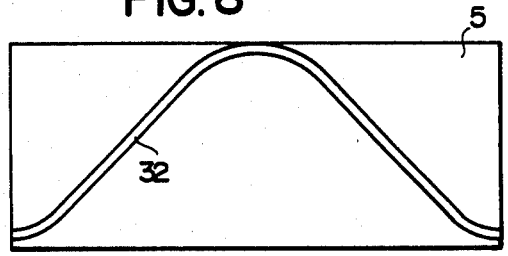
FIG. 8 is an enlarged developed view of the drum cam.

As is shown in FIG. 6, the first rotary blade 11 is shaped generally like an inverted U 11b with a trapezoidal portion extending upwardly from the closed end and having a projection extending laterally to the right having a sharp edge 11a on the top edge thereof and with two downwardly extending legs 11b-1 and 11b-2 at the bottom thereof. And the second rotary blade 12 is also shaped like an inverted U 12b with a downwardly curved, pointed projection extending to the left with a sharp edge 12a along the top edge and with two legs 12b-1 and 12b-2 at the bottom thereof.

The pair of blades 11 and 12 are fixed to bosses 15a and 15b respectively as is shown in FIG. 4.

Bosses 15a and 15b are in meshing engagement with a pair of splines 13a and 13b and are held between plates 14a-1, 14a-2 and 14b-2 (one of the plates which supports the spline 13b is not shown) on holder 4.

The splines 13a and 13b are rotatably supported by bearings 13-1 and 13-2 positioned in the walls of the case 2 (bearings which support the splines 13b are not shown) and are connected to the motor 6 through a gear means located in the gear box 16.

Figure 9:
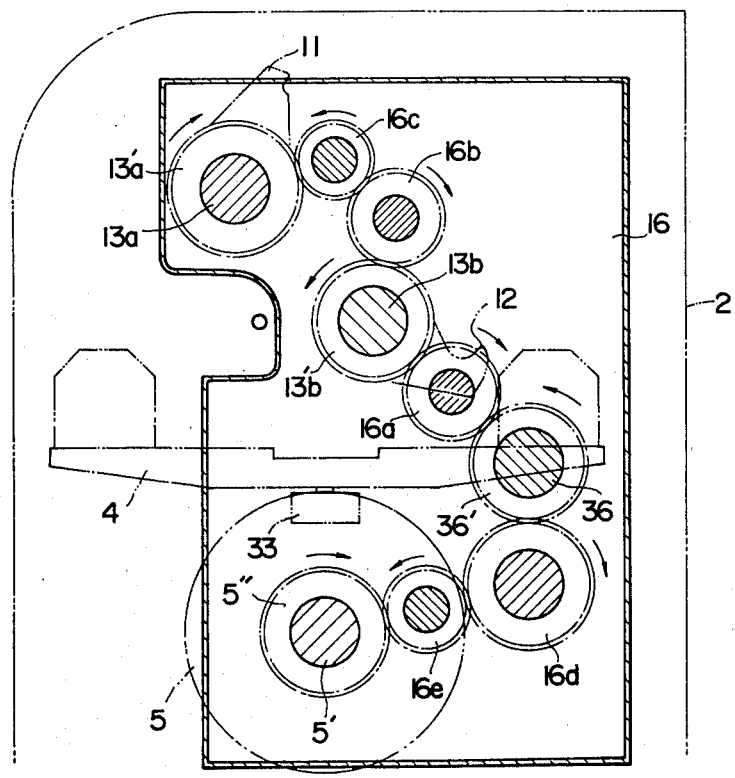
FIG. 9 is a sectional view of the device of FIG. 1 taken along line IX—IX.

The gear means is illustrated in FIG. 9.

A gear 36' which is fixed on a motor shaft 36 drives a gear 5" fixed on a drum cam shaft 5' through two idle gears 16d and 16e. The motor shaft gear 36' also drives a gear 13'b fixed on spline 13b through an idle gear 16a which in turn drives another gear 13'a which is fixed on spline 13a through two idle gears 16b and 16c. The spline shafts 13a and 13b are thus driven in opposite directions so as to rotate the first and the second blades 11 and 12 therewith. Thus, when the spline shaft 13a on which the first blade 11 is mounted rotates clockwise, the other spline shaft 13b on which the second blade 12 is mounted rotates counterclockwise, and the blades are positioned on the shafts so that immediately after the first blade 11 moving along the bottom of its rotational path cuts off a portion of the upper surface of a pipe 10 during its clockwise rotation, the second blade 12 in turn moving downwardly along its rotational path drives the pointed projection therein into the cut made by the first blade 11 and then cuts the end portion of pipe 10 off to form a predetermined length during its counterclockwise motion.

The clamp means comprises a pipe clamp 17, an L-shaped arm 23 and a circular cam 29.

The pipe clamp 17 consists of two pairs of blocks 18a and 18b each block having the same structure. The detailed description of one of the blocks, in reference to FIG. 4, is as follows; the block 18a is provided with an upper rail 19a and a lower rail 19b having square lengthwise grooves 21a-1 and 21a-2 respectively which are arranged to face opposite to each other; two blocks 18a-1 and 18a-2 are positioned between the upper rail 19a and the lower rail 19b, the former of which slides along the grooves 21a-1 and 21a-2 while the latter is fixed in the grooves 21a-1 and 21a-2.

The block 18a-1 is provided with a semi-circular opening 22a-1 while block 18a-2 is also provided with a semi-circular opening 22a-2, both openings having the same shape, the two openings 22a-1 and 22a-2 together constituting a complete circular opening when the block 18a-1 is shifted by means of the arm 23 which will be described hereinafter to contact the block 18a-2 leaving no clearance therebetween.

The edges of semi-circular openings 22a-1 and 22a-2 are so shaped as to function as a cooperating blade as will be described hereinafter.

Two sets of holes 24a-1, 24a-2 and 25a-1, 25a-2 are arranged within the blocks 18a-1 and 18a-2, within which are positioned two coil springs 26a-1 and 26a-2 spanning the gap between the block 18a-1 and block 18a-2 whereby the biasing force of the coil springs 26a-1 and 26a-2 urges the blocks 18a-1 and 18a-2 away from each other.

Since the structure of the other block 18b is exactly the same as block 18a explained hereinbefore, the detailed description is omitted.

The exists a clearance 27 between the two pairs of blocks 18a and 18b which is wide enough for the first blade 11 or the second blade 12 to pass therethrough during their clock-wise and counterclockwise rotation.

L-shaped arm 23 having upper arm portions 23a-1 and 23a-2 and lower arm portions 23b-1 and 23b-2 is rotatably supported on a shaft. At one end of the upper arms 23a-1 and 23a-2 are provided rollers 28a and 28b positioned to contact cams 29a and 29b disposed on the periphery of boss 15a, while at the end of the lower arms 23b-1 and 23b-2, adjustable projections 31a and 31b, for example a bolt and a nut, are arranged to contact the front faces of blocks 18a and 18b respectively. As soon as the rollers 28a and 28b contact cams 29a and 29b disposed on the boss 15a, upper arms 23a-1 and 23a-2 are lifted upward and in turn lower arms 23b-1 and 23b-2 are pushed against the front faces of blocks 18a and 18b, whereby sets of bolts and nuts 31a and 31b push the sliding blocks 18a-1 and 18b-1 toward the fixed blocks 18a-2 (one of the fixed blocks is not shown) against the biasing force of the two pairs of coil springs 26a-1 and 26a-2 (one of the pairs is not shown) until the sliding blocks 18a-1 and 18b-1 make a close contact with the fixed blocks by sliding laterally along square grooves 21a-1, 21a-2 and 21b-1, 21b-2 to the right in FIG. 4, whereby the pipe 10 will be gripped firmly between two pairs of semi-circular openings forming two complete circular openings.

While the pipe 10 is gripped in the two openings, the pair of rotary blades 11 and 12 rotate in opposite directions with the spline shafts and bosses 13a, 15a and 13b, 15b respectively to cut through pipe 10. After the pipe is cut, it is moved laterally and cut again to provide predetermined lengths of pipe.

It is to be noted that edges of the two pairs of openings 22a-1 and 22a-2 and 22b-1 and 22b-2 (one of the pairs is not shown) function as cooperating blades by cooperating with rotating blade 12 when pipe 10 is cut. As soon as the rotating contact between rollers 28a, 28b and cams 29a, 29b come to an end, the wall blocks 18a-1 and 18b-1 are caused to slide back to their normal location by means of the coil springs 26a-1 and 26a-2 and the hold on the pipe 10 is released.

Cam shaft 5' extends through and has the drum cam 5 fixed thereto. This drum cam 5 has a cam groove 32 in which a roller follower 33 fixedly mounted on the underside of the holder means 4 is rotatably engaged. The drum cam 5 is rotatably supported on bearings (not shown) positioned in walls of the box 2. The cam shaft 5' is driven from the motor 6 through the gear means in the gear box 16 and can be connected or disconnected to the motor 6 by means of a conventional clutch mechanism (not shown).

Thus the driving force of the motor 6 is transmitted to the holder means 4 through a gear means, the cam shaft 5', the cam groove 32 of the cam 5 and the roller follower 33, whereby the holder means 4 can be reciprocated laterally.

The cutting operation is performed by the pair of rotary blades 11 and 12 at the mid point of the forward movement of the holder means 4 as will be explained hereinafter.

Numerals 34a and 34b designate pipe guides through which pipe 10 is fed by the carrier so that pipe 10 is inserted into the two pairs of semi-circular openings 22a-1 and 22a-2 in wall blocks 18a-1 and 18a-2 and held therebetween ready for the cutting process.

Numeral 35 designates a chute for delivering scraps of the pipe produced during the cutting process.

The operation of the device is as follows:

The operation is usually performed by a conventional numerical control system, and successive pipe cutting operations are carried out in the following manner.

The driving force of motor 6 is transmitted to the holder means 4 through the cam shaft 5', the cam groove 32 and the follower 33, whereby the holder means 4 is shifted laterally to the right or the left in FIG. 1, along the parallel shafts 8a and 8b.

The rotation of motor 6 is also transmitted to the splines 13a and 13b through the gear means to cause the spline shafts 13a and 13b rotate oppositely to each other to cause the first blade 11 on spline 13a and the second blade 12 on spline 13b rotate oppositely to each other in succession.

The first blade 11 first rotates clockwise 360° passing through clearance 27 between the wall blocks 18a and 18b to cut the top portion of pipe surface to form a slit therein, and then the second blade 12 follows and rotates counterclockwise 360° passing through the clearance 27 to cut pipe 10 the desired length off the pipe.

While the cutting process is thus performed, pipe 10 is fixedly held in the two pairs of openings provided in the wall blocks 18a and 18b, each pair consisting of openings 22a-1, 22a-2, and 22b-1, 22b-2, as heretofore described.

The operation of the pair of blades is arranged to start at a predetermined point in the leftward movement of the holder means 4 (FIG. 1).

Figure 10:
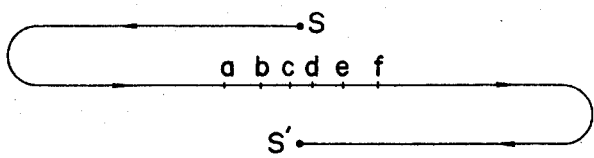
FIG. 10 is a schematic view for showing the manufacturing process and illustrating the movement of the holder means in connection with the pipe carrier, the clamp means and blades.

The location is indicated by a letter s in FIG. 10 which illustrates schematically the relationship between the shifting of the holder means 4 and the steps of clamping, cutting and releasing of the pipe.

Referring to FIG. 10, the holder means 4 starts from the location s which is at the mid point of the leftward shifting and is then changed to a rightward shifting as illustrated, during which the shifting speed of holder means 4 is adjusted to synchronize with the feeding speed of the pipe carrier which is loaded with pipe 10 and is shifting to the right at the location indicated by letter a, after which further rightward shifting of the holder means 4 continues until the speed synchronization with the pipe carrier comes to an end at a location designated by the letter f. During the above operation, the following operations are performed in succession: the actuation of clamping the pipe 10, at the location designated by letter b; the operation of cutting the slit in the pipe surface, at location c; the operation of cutting off a desired length of the pipe 10, at location d; and the releasing of clamping, at location e.

In the same manner as described above, cutting operations can be performed by the device of this invention in succession at varied speeds and to cut different lengths depending on a predetermined format or size of the cut pipe to be produced.

In the embodiment described, spline shafts 13a and 13b are used. However, shafts fitted with sliding keys may be substituted.

It will be realized from the description heretofore made that this invention provides a solution to the problems in conventional pipe shearing devices especially in the following manners.

A pair of rotary blades which take part in the shearing process make it possible to cut a pipe into the desired length without deforming the cut edges or forming dimples.

The use of the spline shaft mechanism permits easy and smooth rotation of rotary blades in conjunction with the shifting movement of the holder means.

A drum cam and a follower are used for the shifting movements of the holder means so as to make it possible to adjust the pipe feeding speed of the pipe carrier to match that of the holder means, thereby eliminating the necessity for installation of additional control means for speed adjustment.

I claim:

1. A pipe shearing device comprising:

a holder means mounted for lateral back and forth movement and having a cam follower thereon;

a cam means engaged by said cam follower;

a motor means connected to said cam means for driving said cam means for moving said holder means back and forth;

a clamp means mounted on said holder means for gripping a pipe and moving the pipe along a fixed axis coaxially of the pipe;

a pair of shafts extending parallel to the direction of movement of said holder means and connected to said motor means for being driven in opposite directions;

a pair of rotary blades mounted on respective shafts for sliding movement therealong and being rotated with said shafts through 360°, the first blade having a peripherally extending cutting edge on the outer peripheral end thereof and the second blade having a laterally extending pointed projection on the outer peripheral end thereof pointing in the direction of rotation of the second blade, the shaft on which the first blade is mounted being positioned for causing the end of the first blade to move across the clamp means during rotation of the first blade for forming a slit in the surface of the pipe to be sheared, and the shaft on which the second blade is mounted being positioned for causing the end of the second blade to move across the clamp means during rotation of the second blade in the same plane as said first blade and at a time subsequent to the movement of the first blade and in a direction to drive the pointed projection thereon into said slit and through the pipe for shearing the pipe; and means on said holder engaging said rotary blades for moving said blades along said shafts during movement of said holder.

2. A pipe shearing device as claimed in claim 1 in which said cam means is a drum cam having a cam groove therein and said cam follower is engaged in said groove.

3. A pipe shearing device as claimed in claim 1 in which said blades are each generally U-shaped with a trapezoidal portion extending outwardly from the closed end of the U and having the respective cutting edge and the pointed projection on the outer end of the trapezoidal portion, and said shafts have bosses therein to which the legs of the U-shaped blades are attached.

4. A pipe shearing device as claimed in claim 3 in which said shafts are spline shafts.

5. A pipe shearing device as claimed in claim 3 in which said clamp means comprises two pairs of wall blocks, each pair having a fixed block and a sliding block slidable laterally of the direction of movement of said holder, the respective fixed and sliding blocks having mating semi-circular openings in the opposed ends thereof for gripping a pipe therein, means normally urging said pairs of wall blocks apart, and pushing means engaged with the sliding blocks for urging the sliding blocks toward the fixed blocks for clamping a pipe, one of said pairs of blocks being spaced from the other in the direction of movement of the holder and said blades being rotatable in the space between said pairs of blocks.

6. A pipe shearing device as claimed in claim 5 in which said pushing means comprises a pair of arms pivotally mounted on said holder and having the lower ends engaged with said sliding blocks, and further cams on said shafts with which the upper ends of said arms are engaged for pivoting said lower ends of said arms for moving said sliding blocks toward said fixed blocks.

\* \* \* \* \*